(12) United States Patent
Qin et al.

(10) Patent No.: US 10,591,779 B2
(45) Date of Patent: Mar. 17, 2020

(54) DISPLAY PANEL HAVING MINIMUM DISTANCE FROM SPACER TO ADJACENT ACTIVE DISPLAY REGION WITHIN PRESET RANGE AND DISPLAY DEVICE

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Yifeng Qin, Beijing (CN); Yongshan Zhou, Beijing (CN); Jingpeng Li, Beijing (CN)

(73) Assignees: BOE Technology Group Co., Ltd., Beijing (CN); Beijing BOE Optoelectronics Technology Co., Ltd., Beijing (CN)

(*) Notice: Subject to any disclaimer, the term of this patent is extended or adjusted under 35 U.S.C. 154(b) by 0 days.

(21) Appl. No.: 14/908,651

(22) PCT Filed: Sep. 18, 2015

(86) PCT No.: PCT/CN2015/090001
§ 371 (c)(1),
(2) Date: Jan. 29, 2016

(87) PCT Pub. No.: WO2016/107221
PCT Pub. Date: Jul. 7, 2016

(65) Prior Publication Data
US 2016/0334672 A1   Nov. 17, 2016

(30) Foreign Application Priority Data

Dec. 30, 2014   (CN) .......................... 2014 1 0844298

(51) Int. Cl.
G02F 1/1337    (2006.01)
G02F 1/1339    (2006.01)

(52) U.S. Cl.
CPC .... *G02F 1/133784* (2013.01); *G02F 1/13394* (2013.01); *G02F 2001/13396* (2013.01); *G02F 2001/13398* (2013.01)

(58) Field of Classification Search
CPC combination set(s) only.
See application file for complete search history.

(56) References Cited

U.S. PATENT DOCUMENTS

| 9,176,339 B2 | 11/2015 | Kim et al. |
| 2002/0140893 A1 | 10/2002 | Yi et al. |

(Continued)

FOREIGN PATENT DOCUMENTS

| CN | 102346339 A | 2/2012 |
| CN | 103984158 A | 8/2014 |

(Continued)

OTHER PUBLICATIONS

International Search Report of PCT/CN2015/090001 in Chinese, dated Dec. 18, 2015 with English translation.

(Continued)

*Primary Examiner* — Lauren Nguyen
(74) *Attorney, Agent, or Firm* — Collard & Roe, P.C.

(57) ABSTRACT

A display panel and a display device are provided. The display panel comprises a first substrate (1) and a second substrate (2) provided opposite to each other, and a spacer (101) provided between the first substrate (1) and the second substrate (2). The spacer (101) is covered with an alignment film (4), both the first substrate (1) and the second substrate (2) includes an active display region (102) and a non-display region (103), the spacer (101) is provided in the non-display region (103) of the first substrate (1) and the non-display (Continued)

region (103) of the second substrate (2). A minimum distance value from an edge of the spacer (101), which is an edge closest to the active display region (102) along a rubbing direction of the alignment film (4), to the active display region (102) along the rubbing direction of the alignment film (4) is within a preset range for avoiding light leakage caused by the spacer. In the case that an aperture ratio is ensured, light leakage due to insufficient strength of rubbing the alignment film (4) in a partial region caused by shielding of the spacer (101) is avoided.

<div align="center">17 Claims, 5 Drawing Sheets</div>

(56) References Cited

U.S. PATENT DOCUMENTS

| | | | |
|---|---|---|---|
| 2003/0193640 A1 | 10/2003 | Park et al. | |
| 2005/0052607 A1* | 3/2005 | Mori | G02F 1/13394 |
| | | | 349/155 |
| 2008/0192189 A1* | 8/2008 | Haruyama | G02F 1/133371 |
| | | | 349/114 |
| 2008/0252830 A1 | 10/2008 | Son et al. | |
| 2012/0268699 A1 | 10/2012 | Min et al. | |
| 2014/0036207 A1 | 2/2014 | Yu et al. | |
| 2014/0307209 A1 | 10/2014 | Tomioka et al. | |
| 2015/0185515 A1 | 7/2015 | Yu et al. | |
| 2015/0293394 A1 | 10/2015 | Chung et al. | |

FOREIGN PATENT DOCUMENTS

| | | |
|---|---|---|
| CN | 104460123 A | 3/2015 |
| TW | M479436 U | 6/2014 |

OTHER PUBLICATIONS

Notice of Transmittal of the International Search Report of PCT/CN2015/090001 in Chinese, dated Dec. 18, 2015.

Written Opinion of the International Searching Authority of PCT/CN2015/090001 in Chinese, dated Dec. 18, 2015 with English translation.

Extended European Search Report in EP 15874906.9 dated May 28, 2018.

* cited by examiner

DISPLAY PANEL HAVING MINIMUM DISTANCE FROM SPACER TO ADJACENT ACTIVE DISPLAY REGION WITHIN PRESET RANGE AND DISPLAY DEVICE

CROSS REFERENCE TO RELATED APPLICATIONS

This application is the National Stage of PCT/CN2015/090001 filed on Sep. 18, 2015, which claims priority under 35 U.S.C. § 119 of Chinese Application No. 201410844298.4 filed on Dec. 30, 2014, the disclosure of which is incorporated by reference.

TECHNICAL FIELD

Embodiments of the present disclosure relate to a display panel and a display device.

BACKGROUND

With the developments of liquid crystal display technology, user's requirements on contrast of a liquid crystal display device become higher and higher. Generally, there are two methods for achieving high contrast: increasing a brightness value of a bright state of the liquid crystal display device, and reducing a brightness value of a dark state of the liquid crystal display device. Since the increasing the brightness value of the bright state of the liquid crystal display device leads to the increase of power consumption of the liquid crystal display device, the contrast of the display device is generally enhanced by reducing the brightness value of the dark state of the display device in practical production procedure.

In a process of rubbing an alignment film, due to existence of a spacer, a partial region of the alignment film cannot be rubbed normally, so that rubbing strength of the region is smaller than rubbing strength of other regions of the alignment film. Since the rubbing strength of the region is smaller than the rubbing strength of other regions of the alignment film, liquid crystal molecules provided in the region cannot achieve normal alignment. If the region overlaps an active display region, the rubbing strength of the alignment film within the overlapping region is smaller, and thus abnormality of liquid crystal alignment occurs so that light leakage occurs in the liquid crystal display device. Due to the light leakage, the brightness value of the dark state of the liquid crystal display device is increased and the contrast is decreased. In order to reduce the above-described light leakage, a width of a black matrix has to be increased so as to reduce possibility that the region in which the liquid crystal is unable to achieve normal alignment overlaps the active display region. However, increase of the width of the black matrix will lead to decrease of an aperture ratio.

SUMMARY

Embodiments of the present disclosure provide a display panel. The display panel comprises a first substrate and a second substrate provided opposite to each other, and a spacer provided between the first substrate and the second substrate. The spacer is covered with an alignment film, both the first substrate and the second substrate includes an active display region and a non-display region, the spacer is provided in the non-display region of the first substrate and the non-display region of the second substrate. A minimum distance value from an edge of the spacer, which is an edge closest to the active display region along a rubbing direction of the alignment film, to the active display region along the rubbing direction of the alignment film is within a preset range for avoiding light leakage caused by the spacer.

For example, the preset range is proportional to a height of the spacer, and is inversely proportional to a rubbing strength of rubbing the alignment film.

For example, the minimum distance value from the edge of the spacer, which is the edge closest to the active display region along the rubbing direction of the alignment film, to the active display region along the rubbing direction of the alignment film is within the preset range for avoiding light leakage caused by the spacer, which includes: in the case that the height of the spacer and the rubbing strength of rubbing the alignment film are constant, the minimum distance value from the edge of the spacer in a first region, which is the edge closest to the active display region along the rubbing direction of the alignment film, to the active display region along the rubbing direction of the alignment film is no less than a first preset value, and wherein the first region is a region in which the spacer and the active display region are both provided along the rubbing direction of the alignment film.

For example, the first preset value is 6.79 microns.

For example, in the case that the height of the spacer and the rubbing strength of rubbing the alignment film are constant, a minimum distance value from the active display region to another edge of the spacer in the first region along the rubbing direction of the alignment film is no less than a second preset value and the another edge of the spacer is an edge closest to the active display region along a direction opposite to the rubbing direction of the alignment film, and wherein the second preset value is determined according to position precision for providing the spacer and fabrication precision of the spacer.

For example, a minimum distance value from the spacer in a second region to the active display region is no less than a second preset value, wherein the second region is a region in which the spacer is provided along the rubbing direction of the alignment film and the active display region is not provided along the rubbing direction of the alignment film.

For example, the second preset value is 2 microns.

For example, a shape of the spacer is an irregular shape determined according to a preset range.

For example, the shape of the spacer is an irregular shape in which, the distance value from the edge of the spacer in the first region, which is the edge closest to the active display region along the rubbing direction of the alignment film, to the active display region along the rubbing direction of the alignment film is equal to the first preset value, and the distance value from the active display region to the another edge of the spacer in the first region along the rubbing direction of the alignment film is equal to the second preset value and the another edge of the spacer is the edge closest to the active display region along the direction opposite to the rubbing direction of the alignment film.

Embodiments of the present disclosure provide a display device, and the display device comprises the display panel as described above.

BRIEF DESCRIPTION OF THE DRAWINGS

In order to clearly illustrate the technical solution of the embodiments of the present disclosure, the drawings of the embodiments will be briefly described in the following; it is obvious that the described drawings are only related to some embodiments of the present disclosure and thus are not limitative of the present disclosure.

DETAILED DESCRIPTION

In order to make the objective, technical solutions, and advantages of the present disclosure clearer, the present disclosure is further described in detail hereinafter in conjunction with the accompanying drawings; and it is obvious that the described embodiments are just part of rather than all of the embodiments of the present disclosure. Based on the described embodiments herein, those skilled in the art can obtain other embodiment(s), without any inventive work, which should be within the scope of the disclosure.

Embodiments of the present disclosure provide a display panel and a display device. In the embodiments of the disclosure, a minimum distance value from an edge of a spacer to an active display region along a rubbing direction of an alignment film is limited and the edge of the spacer is an edge which is closest to the active display region along the rubbing direction of the alignment film; in this way, an aperture ratio is ensured, and meanwhile light leakage due to insufficient rubbing strength in a partial region of the alignment film caused by the spacer is avoided.

During the fabrication process of the display panel, prior to a step of rubbing the alignment film, the spacer is provided. Therefore, during performing the rubbing process on the alignment film, due to shielding of the spacer, rubbing strength of a partial region of the alignment film is smaller than a normal rubbing strength, and a rubbing shadow is generated, so that liquid crystal molecules in the region cannot be normally aligned, resulting in light leakage.

Figure 1:
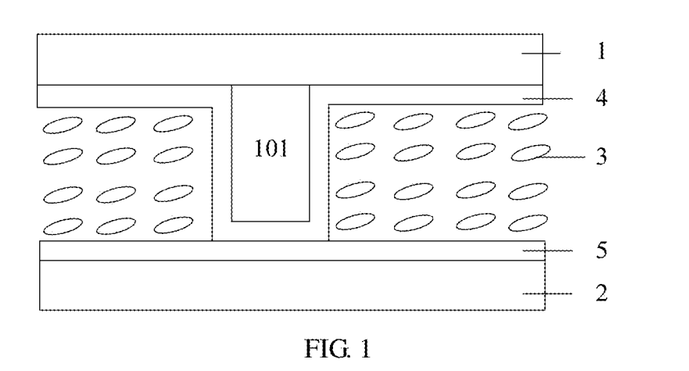
FIG. 1 is a cross-sectional schematic view illustrating a display panel according to an embodiment of the present disclosure.
Figure 2:
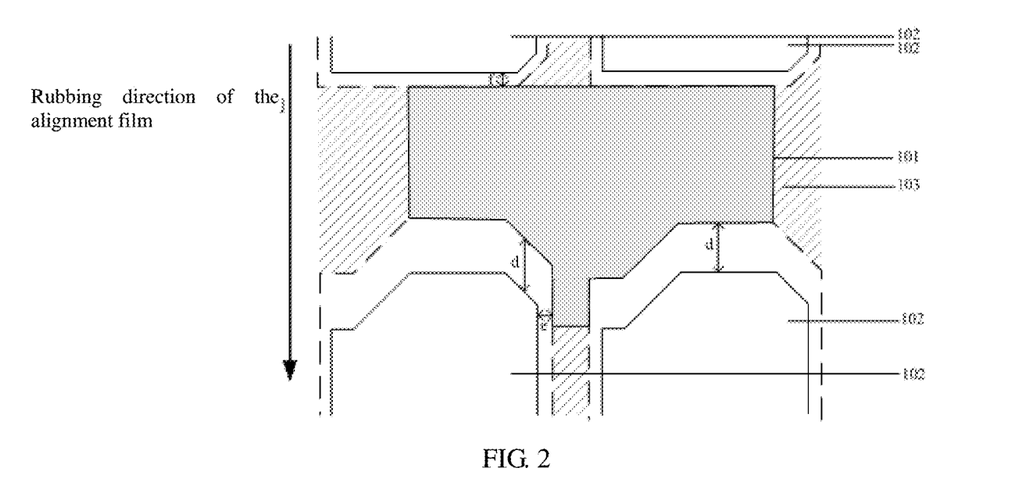
FIG. 2 is a plan schematic view illustrating a first substrate in the case that the first substrate is observed along a direction from a second substrate to the first substrate.

Embodiments of the present disclosure provide a display panel. With reference to FIG. 1 and FIG. 2, the display panel comprises a first substrate 1 and a second substrate 2 provided opposite to each other, and a spacer 101 provided between the first substrate 1 and the second substrate 2, and the spacer 101 is covered with an alignment film 4 formed thereon. Both the first substrate 1 and the second substrate 2 include an active display region 102 and a non-display region 103, the spacer 101 is provided in the non-display region 103 of the first substrate 1 and the non-display region 103 of the second substrate 2, and a minimum distance value d from an edge of the spacer 101, which is an edge closest to the active display region 102 along a rubbing direction of the alignment film 4, to the active display region 102 along the rubbing direction of the alignment film 4 is within a preset range for avoiding light leakage caused by the spacer. For example, the spacer is a columnar spacer.

For example, a liquid crystal layer 3 is further filled between the first substrate 1 and the second substrate 2. The active display region of the first substrate 1 faces the active display region of the second substrate 2, and the non-display region of the first substrate 1 faces the non-display region of the second substrate 2.

It should be noted that, in FIG. 1, as an example, the spacer 101 is provided on the first substrate 1 and is covered by the alignment film 4 provided on the first substrate 1. However, the embodiments of the present disclosure are not limited thereto; the spacer 101 may be provided on the second substrate 2 and covered by an alignment film 5 provided on the second substrate 2; or there may be a plurality of spacers 101, part of the spacers 101 being provided on the first substrate 1 and covered by the alignment film 4, and another part of the spacers 101 being provided on the second substrate 2 and covered by the alignment film 5. In a case where the spacer 101 is provided on the second substrate 2, the minimum distance value d from the edge of the spacer 101, which is the edge closest to the active display region 102 along the rubbing direction of the alignment film 4, to the active display region 102 along the rubbing direction of the alignment film 5 is within the preset range for avoiding light leakage caused by the spacer.

In following description, the case that the spacer 101 is provided on the first substrate 1 and covered by the alignment film 4 provided on the first substrate 1 is described as an example. The spacer on the second substrate 2 can be similarly provided.

For example, the active display region 102 includes a plurality of sub-pixels separated by the non-display region, the minimum distance value d from the edge of the spacer 101, which is the edge closest to the active display region 102 along the rubbing direction of the alignment film 4, to the adjacent sub-pixel along the rubbing direction of the alignment film is within the preset range for avoiding light leakage caused by the spacer.

In the embodiments of the present disclosure, by limiting the minimum distance value d, a rubbing shadow region generated during rubbing the alignment film does not overlap the active display region, so that light leakage caused by shielding of the spacer is reduced.

For example, the preset range is proportional to a height of the spacer, and is inversely proportional to a rubbing strength of the alignment film.

With increase of the height of the spacer, the rubbing shadow generated during rubbing the alignment film is larger, and thus, probability that the rubbing shadow overlaps the active display region is greater. In addition, with decrease of the rubbing strength value of the alignment film, the rubbing shadow generated thereby is larger, and thus, the probability that the rubbing shadow overlaps the active display region is greater.

With reference to FIG. 2, factors affecting the light leakage for example include: the minimum distance value d from the edge of the spacer in a first region, which is the edge closest to the active display region 102 along the rubbing direction of the alignment film 4, to the active display region along the rubbing direction of the alignment film; a minimum distance value f from the active display region to another edge of the spacer in the first region along the rubbing direction of the alignment film (the another edge of the spacer is the edge closest to the active display region 102 along a direction opposite to the rubbing direction of the alignment film 4), i.e., the minimum distance value f from the another edge of the spacer in the first region, which is the edge closest to the active display region 102 along the direction opposite to the rubbing direction of the alignment film 4, to the active display region along the direction opposite to the rubbing direction of the alignment film; and a minimum distance value e from the spacer in a second region to the active display region.

The first region is a region in which the spacer and the active display region are both provided along the rubbing direction of the alignment film; and the second region is a region in which the spacer is provided along the rubbing direction of the alignment film and the active display region is not provided along the rubbing direction of the alignment film.

In the case that both the height value of the spacer and the rubbing strength value of the alignment film are constant, the minimum distance value d from the edge of the spacer in the first region, which is the edge closest to the active display region 102 along the rubbing direction of the alignment film 4, to the active display region along the rubbing direction of the alignment film is inversely proportional to a degree of light leakage caused by the spacer. Thus, in the case where the height of the spacer and the rubbing strength of the alignment film are constant, the minimum distance value d from the edge of the spacer in the first region, which is the edge closest to the active display region 102 along the rubbing direction of the alignment film 4, to the active display region along the rubbing direction of the alignment film is no less than a first preset value.

In the case where the height of the spacer and the rubbing strength of the alignment film are constant, the minimum distance value f from the another edge of the spacer in the first region, which is the edge closest to the active display region 102 along the direction opposite to the rubbing direction of the alignment film 4, to the active display region along the opposite rubbing direction of the alignment film is no less than a second preset value; and the minimum distance value e from the spacer in the second region to the active display region is no less than the second preset value.

By limiting the minimum distance from the spacer in the first region to the active display region along the direction opposite to the rubbing direction of the alignment film, it avoids a fact that due to process errors in fabricating and placing the spacer, the rubbing shadow generated during rubbing the alignment film overlaps the active display region such that liquid crystal molecules in the overlapping region cannot be normally aligned, i.e., light leakage resulted from shielding of the spacer is avoided.

By limiting the minimum distance from the spacer in the second region to the active display region, it avoids a fact that due to process errors in fabricating and placing the spacer, the rubbing shadow generated during rubbing the alignment film overlaps the active display region such that liquid crystal molecules in the overlapping region cannot be normally aligned, i.e., light leakage resulted from shielding of the spacer is avoided.

By performing a plurality times of experiments on the minimum distance d from the edge of the spacer in the first region, which is the edge closest to the active display region 102 along the rubbing direction of the alignment film 4, to the active display region along the rubbing direction of the alignment film, the preset range for avoiding light leakage caused by the spacer is determined. That is, in the case that the minimum distance d from the edge of the spacer in the first region, which is the edge closest to the active display region 102 along the rubbing direction of the alignment film 4, to the active display region along the rubbing direction of the alignment film is no less than the first preset value, light leakage due to the spacer will be reduced to a great extent.

Due to process precision during fabricating the display panel, there is a process error of 1 micron in a position for placing the spacer, and there is a process error of 1.5 microns in a diameter of the spacer. In consideration of the process error, the second preset value for example is 2 microns, i.e., the minimum distance value f from the active display region to the another edge of the spacer in the first region along the rubbing direction of the alignment film (the another edge of the spacer is the edge closest to the active display region 102 along the direction opposite to the rubbing direction of the alignment film 4) is no less than 2 microns, and the minimum distance value e from the spacer in the second region to the active display region is no less than 2 microns. The larger the distances f and e, the better the effect.

Figure 3:
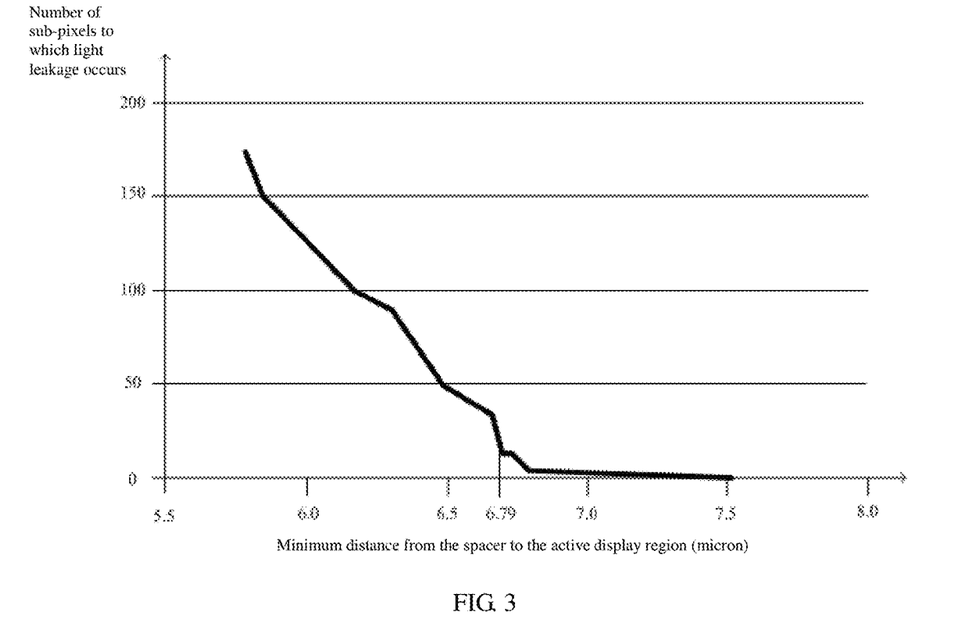
FIG. 3 is a schematic view illustrating a degree of light leakage caused by a spacer and a minimum distance between the spacer and an active display region, for a 5.0-inch liquid crystal display device, in a case where a height of the spacer is 3.8 microns and a rubbing strength value for an alignment film is 176 mm.
Figure 4:
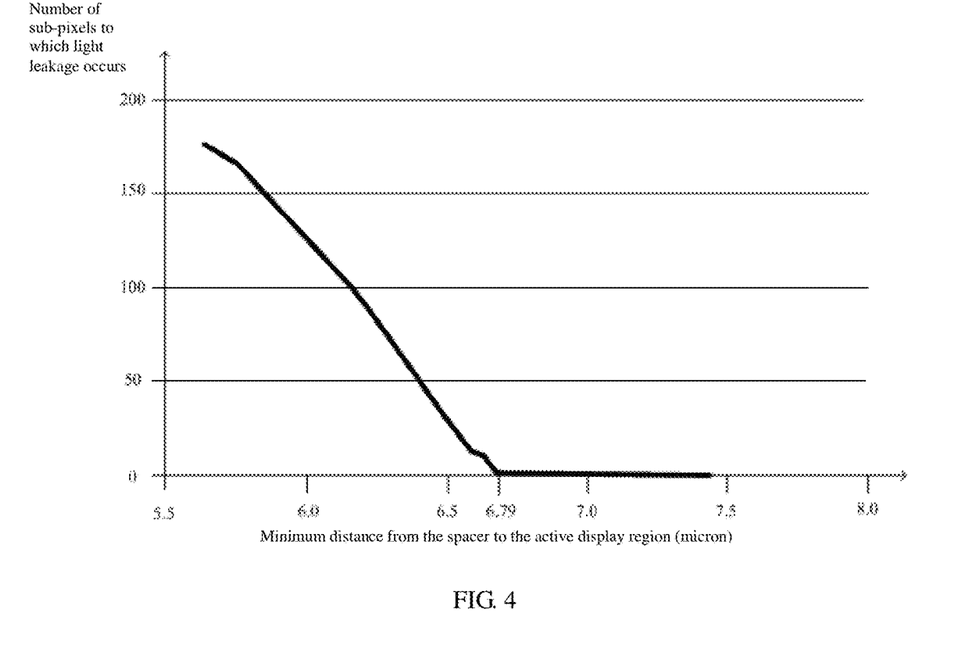
FIG. 4 is a schematic view illustrating the degree of light leakage caused by the spacer and the minimum distance between the spacer and the active display region, for a 5.46-inch liquid crystal display device, in a case where the height of the spacer is 3.8 microns and the rubbing strength value for the alignment film is 176 mm.
Figure 5:
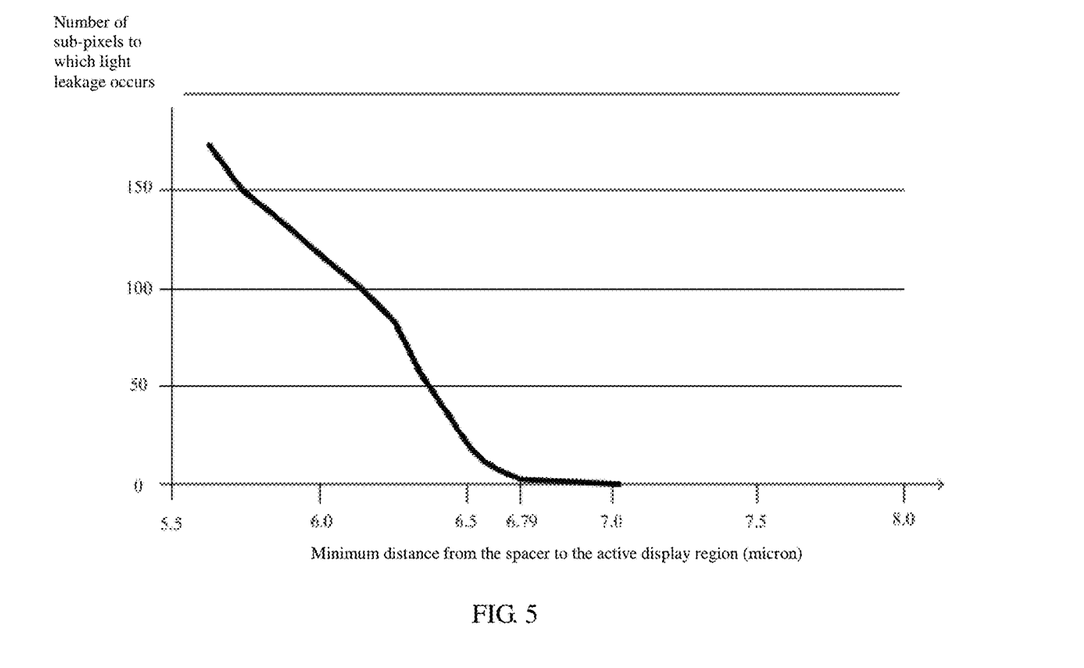
FIG. 5 is a schematic view illustrating the degree of light leakage caused by the spacer and the minimum distance between the spacer and the active display region, for a 5.5-inch liquid crystal display device, in a case where the height of the spacer is 3.8 microns and the rubbing strength value for the alignment film is 176 mm.

Hereinafter, a relationship between the minimum distance value d from the edge of the spacer in the first region, which is the edge closest to the active display region along the rubbing direction of the alignment film, to the active display region along the rubbing direction of the alignment film and the degree of light leakage caused by the spacer will be shown in conjunction with three groups of experimental data charts.

With reference to FIG. 3, with a 5.0-inch liquid crystal display device as an example, in the case that two parameters, i.e., the height value of the spacer being 3.8 microns and the rubbing strength value for the alignment film being 176 mm, remain constant, the degree of light leakage caused by the spacer is alleviated with increase of the minimum distance value from the edge of the spacer in the first region, which is the edge closest to the active display region along the rubbing direction of the alignment film, to the active display region along the rubbing direction of the alignment film. In the case that the minimum distance value from the edge of the spacer in the first region, which is the edge closest to the active display region along the rubbing direction of the alignment film, to the active display region along the rubbing direction of the alignment film reaches 6.79 microns, light leakage occurs to only 3 sub-pixels among every 350 sub-pixels, and no light leakage occurs to the sub-pixels due to overlapping of the rubbing shadow and the active display region.

With reference to FIG. 4, with a 5.46-inch liquid crystal display device as an example, in the case that two parameters, i.e., the height value of the spacer being 3.8 microns and the rubbing strength value for the alignment film being 176 mm, remain constant, the degree of light leakage of the spacer is alleviated with increase of the minimum distance value from the edge of the spacer in the first region, which is the edge closest to the active display region along the rubbing direction of the alignment film, to the active display region along the rubbing direction of the alignment film. Similarly, in the case that the minimum distance value from the edge of the spacer in the first region, which is the edge closest to the active display region along the rubbing direction of the alignment film, to the active display region along the rubbing direction of the alignment film reaches 6.79 microns, no light leakage occurs to the sub-pixels due to overlapping of the rubbing shadow and the active display region.

With reference to FIG. 5, with a 5.5-inch liquid crystal display device as an example, in the case that two parameters, i.e., the height value of the spacer being 3.8 microns and the rubbing strength value for the alignment film being 176 mm, remain constant, the degree of light leakage of the spacer is alleviated with increase of the minimum distance value from the edge of the spacer in the first region, which is the edge closest to the active display region along the rubbing direction of the alignment film, to the active display region along the rubbing direction of the alignment film. Similarly, in the case that the minimum distance value from the edge of the spacer in the first region, which is the edge closest to the active display region along the rubbing direction of the alignment film, to the active display region along the rubbing direction of the alignment film reaches 6.79 microns, no light leakage occurs to the sub-pixels due to overlapping of the rubbing shadow and the active display region.

According to the above-described experimental data, it can be known that, in the case that the height of the spacer is 3.8 microns and the rubbing strength for the alignment film is 176 mm, the minimum distance value d from the edge of the spacer in the first region, which is the edge closest to the active display region along the rubbing direction of the alignment film, to the active display region along the rubbing direction of the alignment film is 6.79 microns, i.e., the first preset value is 6.79 microns, and a size of the display panel does not affect the minimum distance value from the edge of the spacer in the first region, which is the edge closest to the active display region along the rubbing direction of the alignment film, to the active display region along the rubbing direction of the alignment film.

In the case that the two parameters, i.e., the height value of the spacer being 3.8 microns, and the rubbing strength value for the alignment film being 176 mm, remain constant, the minimum distance value d from the edge of the spacer in the first region, which is the edge closest to the active display region along the rubbing direction of the alignment film, to the active display region along the rubbing direction of the alignment film is no less than 6.79 microns.

Therefore, in order to ensure that the rubbing shadow does not overlap the active display region, according to the above-described conclusions, the preset range for providing the spacer is determined, i.e., a region between dashed lines shown in FIG. 2 is the region for providing the spacer.

As described above, the preset value is proportional to the height of the spacer. Thus, in the case that the height of the spacer is greater than 3.8 microns, the minimum distance value is adjusted to be greater than 6.79 microns, and in the case that the height of the spacer is less than 3.8 microns, the minimum distance value is adjusted to be less than 6.79 microns.

As described above, the preset value is inversely proportional to the rubbing strength of the alignment film. Thus, in the case that the rubbing strength of rubbing the alignment film is greater than 176 mm, the minimum distance value is adjusted to be less than 6.79 microns, and in the case that the rubbing strength of rubbing the alignment film is less than 176 mm, the minimum distance value is adjusted to be greater than 6.79 microns.

Figure 6:
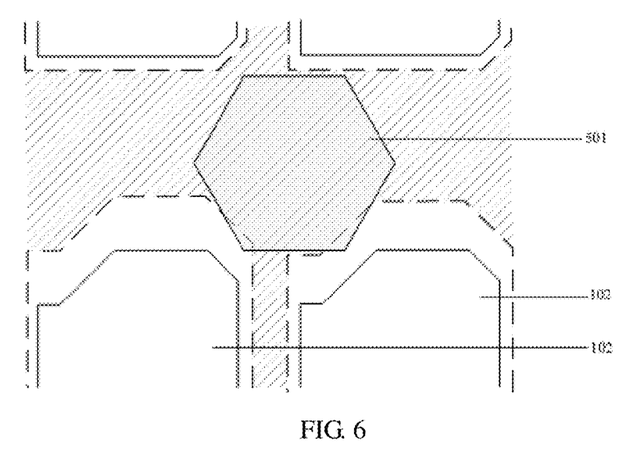
FIG. 6 is a cross-sectional shape of an existing spacer.

An existing spacer generally has a shape of a circle pillar or a regular hexagonal pillar. The spacer 501 with the above shape generally exceeds the preset range. As shown in FIG. 6, the spacer 501 exceeds a region between the dashed lines, and thus the design of the existing spacer generally causes light leakage.

In order to ensure that the spacer does not exceed the range for providing the spacer, it is necessary to redesign the shape of the spacer, so that not only the spacer does not exceed the range for providing the spacer, but also it is ensured that a cross-sectional area of the spacer is equivalent to a cross-sectional area of the spacer designed in the prior art, that is, it is ensured that a support area of the spacer is constant.

Design ideas for the shape of the spacer can be divided into three categories: in a design idea I, the spacer is only provided in the first region; in a design idea II, the spacer is only provided in the second region; and in a design idea III, the spacer has a part thereof provided in the first region and all other parts provided in the second region.

Figure 7:
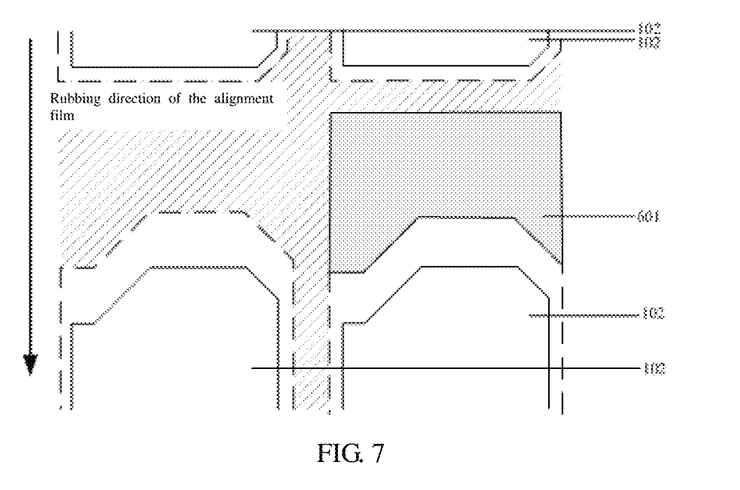
FIG. 7 is Example One of an arrangement mode of a spacer of a display panel according to an embodiment of the present disclosure.

In the design idea I, the spacer is only provided in the first region; that is, the minimum distance value d from the edge of the spacer in the first region, which is the edge closest to the active display region along the rubbing direction of the alignment film, to the active display region along the rubbing direction of the alignment film is no less than 6.79 microns. With reference to FIG. 7, the embodiment of the present disclosure provides a display panel, and in the display panel, the minimum distance value d from the edge of the spacer in the first region, which is the edge closest to the active display region along the rubbing direction of the alignment film, to the active display region along the rubbing direction of the alignment film is equal to 6.79 microns. That is, in the case that the height value of the spacer is 3.8 microns, and the rubbing strength value for the alignment film is 176 mm, the minimum distance value d from the edge of the spacer in the first region, which is the edge closest to the active display region along the rubbing direction of the alignment film, to the active display region along the rubbing direction of the alignment film is equal to 6.79 microns.

Figure 8:
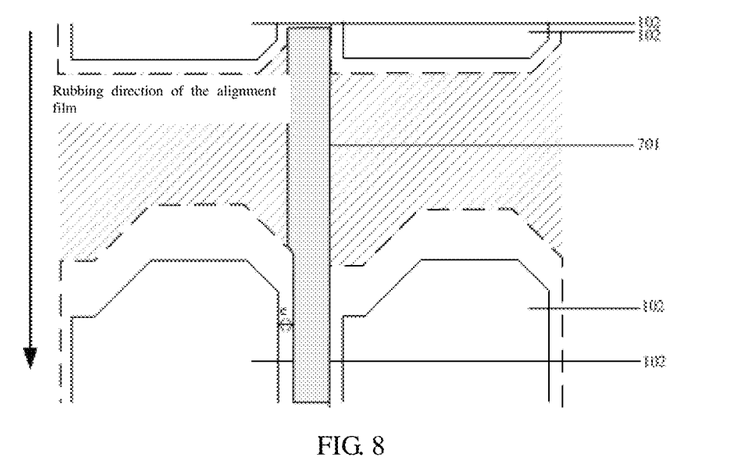
FIG. 8 is Example Two of the arrangement mode of the spacer of the display panel according to the embodiment of the present disclosure.

In the design idea II, the spacer is only provided in the second region, that is, the minimum distance value e from the spacer in the second region to the active display region is no less than 2 microns. With reference to FIG. 8, the embodiment of the present disclosure provides a display panel, and in the display panel, the minimum distance value e from the spacer in the second region to the active display region is equal to 2 microns. That is, in the case that the height value of the spacer is 3.8 microns and the rubbing strength value for the alignment film is 176 mm, the minimum distance e from the spacer 701 in the second region to the edge of the active display region 102 is equal to 2 microns.

Figure 9:
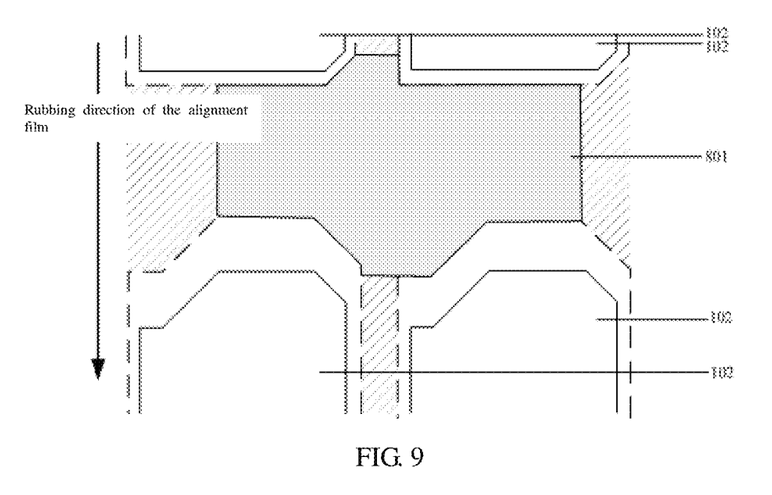
FIG. 9 is Example Three of the arrangement mode of the spacer of the display panel according to the embodiment of the present disclosure.

In the design idea III, the spacer has a part thereof provided in the first region and all other parts provided in the second region. That is, the minimum distance value d from the edge of the spacer in the first region, which is the edge closest to the active display region along the rubbing direction of the alignment film, to the active display region along the rubbing direction of the alignment film is no less than 6.79 microns, and the minimum distance e from the spacer in the second region to the active display region is no less than 2 microns. With reference to FIG. 9, the embodiment of the present disclosure provides a display panel, and in the display panel, the minimum distance value d from the edge of the spacer in the first region, which is the edge closest to the active display region along the rubbing direction of the alignment film, to the active display region along the rubbing direction of the alignment film is equal to 6.79 microns, and the minimum distance value e from the spacer 801 in the second region to the active display region is equal to 2 microns. That is, in the case that the height value of the spacer is 3.8 microns and the rubbing strength value for the alignment film is 176 mm, the minimum distance value d from the edge of the spacer in the first region, which is the edge closest to the active display region along the rubbing direction of the alignment film, to the active display region along the rubbing direction of the alignment film is equal to 6.79 microns, and the minimum distance value e from the spacer 801 in the second region to the active display region is equal to 2 microns.

For example, the shape of the spacer is a shape determined according to the preset range; that is, the shape of the spacer is a regular shape, or is an irregular shape with an edge parallel to the edge of the active display region.

For example, the shape of the spacer is an irregular shape, in which, in the first region, the distance value from the edge of the spacer in the first region, which is the edge closest to the active display region along the rubbing direction of the alignment film, to the active display region along the rubbing direction of the alignment film is equal to the first preset value, and the distance value from the active display region to another edge of the spacer in the first region along the rubbing direction of the alignment film (the another edge of the spacer is the edge closest to the active display region along the direction opposite to the rubbing direction of the alignment film) is equal to the second preset value, with reference to that shown in FIG. 2.

Due to constraints of process conditions, the design idea II generally cannot reach the support area required by the spacer, and thus, the spacer of the design idea I or the design idea III is generally used, so that not only it is ensured that the support area of the spacer is constant, but also occurrence of light leakage caused by the spacer is avoided.

Embodiments of the present disclosure further provide a display device, and the display device comprises the display panel as described above.

The embodiments of the present disclosure provide the display panel and the display device. The minimum distance value from the edge of the spacer to the active display region along the rubbing direction of the alignment film is limited and the edge of the spacer is the edge which is closest to the active display region along the rubbing direction of the alignment film; in this way, the aperture ratio is ensured, and meanwhile light leakage due to insufficient rubbing strength in a partial region of the alignment film caused by the spacer is avoided so that the contrast of the display panel is increased. In addition, due to sufficient use of the distance between the active display regions, the minimum distance value from the edge of the spacer in the first region, which is the edge closest to the active display region along the rubbing direction of the alignment film, to the active display region along the rubbing direction of the alignment film is limited, increase of a width of a black matrix is avoided, so that narrow frame of the display panel is easily achieved without affecting the aperture ratio. Furthermore, the higher the height of the spacer, the greater an amount of the liquid crystal injected, and the greater the rubbing strength of rubbing the alignment film, the higher the requirements on the rubbing cloth; and thus, according to a relationship between the preset range and the height of the spacer as well as the rubbing strength of rubbing the alignment film, a suitable range for providing the spacer is defined, so as to avoid light leakage caused by the spacer.

The foregoing embodiments merely are exemplary embodiments of the disclosure, and not intended to define the scope of the disclosure, and the scope of the disclosure is determined by the appended claims.

The present application claims priority of Chinese Patent Application No. 201410844298.4 filed on Dec. 30, 2014, the disclosure of which is incorporated herein by reference in its entirety as part of the present application.

The invention claimed is:

1. A display panel, comprising a first substrate and a second substrate provided opposite to each other, and a spacer provided between the first substrate and the second substrate, the spacer being covered with an alignment film, both the first substrate and the second substrate including an active display region and a non-display region, the spacer being provided in the non-display region of the first substrate and the non-display region of the second substrate, wherein, a minimum distance value from an edge of the spacer, which is an edge closest to the active display region along a rubbing direction of the alignment film, to the active display region along the rubbing direction of the alignment film is within a preset range for avoiding light leakage caused by the spacer, and is larger than a minimum distance value from the active display region to another edge of the spacer along the rubbing direction of the alignment film, in which the another edge of the spacer is an edge closest to the active display region along a direction opposite to the rubbing direction of the alignment film;

the active display region comprises two groups of active display sub-regions, each of the groups of the active display sub-regions comprises a first active display sub-region and a second active display sub-region, the first active display sub-region is located in an upstream of the rubbing direction, and the second active display sub-region is located in a downstream of the rubbing direction, the display panel comprises a plurality of spacers, each of the spacers is adjacent to the first active display sub-region and the second active display sub-region of the two groups of active display sub-regions respectively, and adjacent spacers are separated by the active display region.

2. The display panel according to claim 1, wherein, the preset range is proportional to a height of the spacer, and is inversely proportional to a rubbing strength of rubbing the alignment film.

3. The display panel according to claim 1, wherein, the minimum distance value from the edge of the spacer, which is the edge closest to the active display region along the rubbing direction of the alignment film, to the active display region along the rubbing direction of the alignment film is within the preset range for avoiding light leakage caused by the spacer, which includes:

the minimum distance value from the edge of the spacer in a first region, which is the edge closest to the active display region along the rubbing direction of the alignment film, to the active display region along the rubbing direction of the alignment film is no less than a first preset value, and wherein the first region is a region in which the spacer and the active display region are both provided along the rubbing direction of the alignment film.

4. The display panel according to claim 3, wherein, the first preset value is 6.79 microns.

5. The display panel according to claim 3, wherein the minimum distance value from the active display region to another edge of the spacer in the first region along the rubbing direction of the alignment film is no less than a second preset value and the another edge of the spacer is an edge closest to the active display region along a direction opposite to the rubbing direction of the alignment film, and wherein the second preset value is determined according to position precision for providing the spacer and fabrication precision of the spacer.

6. The display panel according to claim 3, wherein, a minimum distance value from the spacer in a second region to the active display region is no less than a second preset value, wherein the second region is a region in which the spacer is provided along the rubbing direction of the alignment film and the active display region is not provided along the rubbing direction of the alignment film.

7. The display panel according to claim 5, wherein, the second preset value is 2 microns.

8. The display panel according to claim 5, wherein, a shape of the spacer is an irregular shape determined according to a preset range.

9. The display panel according to claim 8, wherein, the shape of the spacer is an irregular shape in which, the distance value from the edge of the spacer in the first region, which is the edge closest to the active display region along the rubbing direction of the alignment film, to the active display region along the rubbing direction of the alignment film is equal to the first preset value, and the distance value from the active display region to the another edge of the spacer in the first region along the rubbing direction of the alignment film is equal to the second preset value and the another edge of the spacer is the edge closest to the active display region along the direction opposite to the rubbing direction of the alignment film.

10. A display device, comprising the display panel according to claim 1.

11. The display panel according to claim 2, wherein, the minimum distance value from the edge of the spacer, which is the edge closest to the active display region along the rubbing direction of the alignment film, to the active display region along the rubbing direction of the alignment film is within the preset range for avoiding light leakage caused by the spacer, which includes:

the minimum distance value from the edge of the spacer in a first region, which is the edge closest to the active display region along the rubbing direction of the alignment film, to the active display region along the rubbing direction of the alignment film is no less than a first preset value, and wherein the first region is a region in which the spacer and the active display region are both provided along the rubbing direction of the alignment film.

12. The display panel according to claim 11, wherein, the first preset value is 6.79 microns.

13. The display panel according to claim 11, wherein a minimum distance value from the active display region to another edge of the spacer in the first region along the rubbing direction of the alignment film is no less than a second preset value and the another edge of the spacer is an edge closest to the active display region along a direction opposite to the rubbing direction of the alignment film, and wherein the second preset value is determined according to position precision for providing the spacer and fabrication precision of the spacer.

14. The display panel according to claim 11, wherein, a minimum distance value from the spacer in a second region to the active display region is no less than a second preset value, wherein the second region is a region in which the spacer is provided along the rubbing direction of the alignment film and the active display region is not provided along the rubbing direction of the alignment film.

15. The display panel according to claim 13, wherein, the second preset value is 2 microns.

16. The display panel according to claim 13, wherein, a shape of the spacer is an irregular shape determined according to a preset range.

17. The display panel according to claim 16, wherein, the shape of the spacer is an irregular shape in which, the distance value from the edge of the spacer in the first region, which is the edge closest to the active display region along the rubbing direction of the alignment film, to the active display region along the rubbing direction of the alignment film is equal to the first preset value, and the distance value from the active display region to the another edge of the spacer in the first region along the rubbing direction of the alignment film is equal to the second preset value and the another edge of the spacer is the edge closest to the active display region along the direction opposite to the rubbing direction of the alignment film.

* * * * *